(12) United States Patent
Schneider et al.

(10) Patent No.: US 12,440,940 B2
(45) Date of Patent: Oct. 14, 2025

(54) APPARATUS AND METHOD FOR DEBLOCKING A LENS

(71) Applicant: SCHNEIDER GMBH & CO. KG, Fronhausen (DE)

(72) Inventors: Gunter Schneider, Marburg (DE); Klaus Hofmann, Wehrheim (DE); Thomas Simmer, Biedenkopf-Breidenstein (DE); Klaus Krämer, Dautphetal-Friedensdorf (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 1500 days.

(21) Appl. No.: 16/487,683

(22) PCT Filed: Feb. 15, 2018

(86) PCT No.: PCT/EP2018/053743
§ 371 (c)(1),
(2) Date: Nov. 14, 2019

(87) PCT Pub. No.: WO2018/153764
PCT Pub. Date: Aug. 30, 2018

(65) Prior Publication Data
US 2020/0130126 A1 Apr. 30, 2020

(30) Foreign Application Priority Data
Feb. 22, 2017 (DE) .......................... 10 2017 001 679

(51) Int. Cl.
*B24B 13/005* (2006.01)
(52) U.S. Cl.
CPC ................................. *B24B 13/0057* (2013.01)
(58) Field of Classification Search
CPC .......... B24B 13/0057; B29D 11/00009; B29D 11/00423; B29D 11/00942
See application file for complete search history.

(56) References Cited

U.S. PATENT DOCUMENTS 4,781,452 A * 11/1988 Ace .................. B29D 11/00009
451/43
6,113,817 A * 9/2000 Herbrechtsmeier ........................
B29D 11/00259
264/2.6

(Continued)

FOREIGN PATENT DOCUMENTS

| AT | 410 191 B | 2/2003 |
| CN | 204504440 U | 7/2015 |

(Continued)

OTHER PUBLICATIONS

山本 賞也 Publication Jul. 5, 2016 retrieved translation from Espacenet: https://worldwide.espacenet.com/patent/search/family/049952846/publication/JP5944753B2?q=jp5944753b2 (Year: 2016).*

Primary Examiner — Monica S Carter
Assistant Examiner — Christopher Soto
(74) Attorney, Agent, or Firm — Calderon Safran & Wright P.C.; David S. Safran

(57) ABSTRACT

An apparatus and a method for deblocking a lens, wherein the lens is blocked with a block material on a block piece. The block material is preheated by radiation. The blocked lens, the deblocked lens, and the deblocked block piece are handled by means of separate grippers. For deblocking, the lens and the block piece are held by opposing holding devices in a rotating manner, while a fluid jet acts on the block material from the side. After the deblocking, the lens and the block piece are cleaned simultaneously. Then, a holding device together with the deblocked lens pivot out from a working space. The deblocked lens is placed with the block side upward in a transport carrier. This makes possible a simple design and an optimized process sequence.

13 Claims, 7 Drawing Sheets

(56) References Cited

U.S. PATENT DOCUMENTS

| | | | |
|---|---|---|---|
| 6,439,870 B1 * | 8/2002 | Marceau | B29D 11/00201 |
| | | | 425/111 |
| 8,141,220 B2 | 3/2012 | Guardia Aura | |
| 8,931,769 B2 * | 1/2015 | Pavel | B29D 11/00942 |
| | | | 269/20 |
| 9,120,196 B2 * | 9/2015 | Geurts | B24B 13/0057 |
| 9,340,669 B2 | 5/2016 | Schneider et al. | |
| 2009/0305614 A1 * | 12/2009 | Nauche | B24B 9/146 |
| | | | 451/42 |
| 2010/0170635 A1 | 7/2010 | Savoie | |
| 2013/0061462 A1 | 3/2013 | Geurts et al. | |

FOREIGN PATENT DOCUMENTS

| | | | |
|---|---|---|---|
| DE | 10353553 A1 | 6/2005 | |
| DE | 102015011031 A1 | 2/2017 | |
| JP | 5944753 B2 * | 7/2016 | |
| WO | 2008116946 A1 | 10/2008 | |
| WO | 2015101652 A1 | 7/2015 | |

* cited by examiner

APPARATUS AND METHOD FOR DEBLOCKING A LENS

BACKGROUND OF THE INVENTION

Field of the Invention

This invention relates to an apparatus for deblocking a lens from a block piece, on which the lens is blocked by means of a block material, wherein a block facing side of the lens is optimally provided with a protective layer, and a method for deblocking a lens from a block piece on which the lens is blocked by means of a block material.

Lenses, in particular eyeglass lenses, are blocked, i.e., fastened and/or secured, for processing usually on a so-called block piece as a holder by means of a so-called block material. The block piece is used to hold the lens that is fastened therein—i.e., blocked—in a very precise and defined way for some or multiple processing steps. The lens is then deblocked again, i.e., detached from the block piece. With respect to an economical lens manufacturing, this is to be done efficiently and quickly in a simple way.

As block material, alloys with low melting points and thermoplastics, i.e., thermoplastic materials, or non-thermoplastic materials, in particular hardening adhesives, can be used. Depending on the block material that is used, various requirements and/or process sequences arise from deblocking, i.e., detaching the lens from the block piece and/or block material.

The lens can optionally be provided on its block side (flat side) that faces the block piece and/or block material with an in particular bonded protective film. During deblocking and/or after the deblocking, the protective film is then preferably also removed in particular for further processing and/or for subsequent coating of the lens. This can be carried out according to the invention even during deblocking and/or in the apparatus for deblocking.

DESCRIPTION OF RELATED ART

German Patent Application DE 103 53 553 A1 discloses a facility and a method for deblocking eyeglass lenses, i.e., lenses for eyeglasses, wherein the lenses are guided or conveyed by means of a strip-like conveying device for deblocking by a tempered water bath and then after separation from the block piece continuously in succession through multiple cleaning devices. This facility is relatively large and does not allow for optimal throughput.

European Patent EP 2 042 265 B1 and corresponding U.S. Pat. No. 8,141,220 B2 disclose a method for deblocking and removing of the protective film. The block material is preheated by the action of a heated fluid on the lens and the block piece. In particular, the blocked lens is immersed for this purpose in the heated liquid. After the preheating, a lateral high-pressure jet of the above-mentioned fluid is directed onto the block piece at the boundary with the block material in order to detach the block piece. Finally, a jet of warm liquid is directed with varying inclinations onto the contour of the lens or the edge of the protective film, wherein the lens rotates here in order to detach the protective film. Finally, the lens is dried and delivered to a shipping container.

International Patent Publication WO 2008/116946 A1 discloses a device for deblocking lenses with spring-preloaded arms for holding block pieces of lenses during the deblocking.

German Patent Application DE 10 2009 048 590 A1 and corresponding U.S. Pat. No. 8,931,769 B2 disclose a device for deblocking eyeglass lenses. An eyeglass lens that is to be deblocked is held, on the one hand, on the block piece, and, on the other hand, on its free flat side, wherein the blocked eyeglass lens is rotated and a nozzle directs a high-pressure jet onto the interface between block piece and eyeglass lens. The nozzle can be moved along the axis of rotation in a position-controlled manner, so that the high-pressure jet is directed onto a predetermined point of impact between eyeglass lens and block piece. Furthermore, the nozzle can also be adjusted radially, and its inclination to the axis of rotation can be set. The device requires an angle-defined clamping of the block piece and detection of the rotational position of the eyeglass lens in order to be able to direct the high-pressure jet precisely onto the interface between block piece and eyeglass lens, so that hardening adhesive can be detached as block material. Block material that adheres to the eyeglass lens can be removed after the deblocking by means of another rotating high-pressure jet via a nozzle that is provided specifically for this purpose.

SUMMARY OF THE INVENTION

The object of this invention is to indicate an apparatus and a method for deblocking a lens, wherein a simple and compact design and/or an economical and fast deblocking with high throughput is and/or are made possible.

The above object is achieved by an apparatus and method as described herein.

The deblocking, i.e., detaching, of a lens from a block piece on which the lens is blocked—i.e., temporarily fastened—by means of a block material, is carried out especially preferably by means of a fluid jet, wherein the blocked lens is rotated in particular.

Especially preferably, a thermoplastic or another material is used as block material.

The lens is optionally provided with a protective layer and/or protective film on its block side.

According to a first aspect of this invention, the apparatus is preferably designed for simultaneous removal, on the one hand, of block material from a deblocked block piece by means of a fluid jet and, on the other hand, of the protective layer and/or of block material from the deblocked lens by means of another fluid jet. In terms of the method, after the deblocking, preferably the block material from the deblocked block piece and the protective layer or the block material from the deblocked lens are simultaneously removed by means of separate fluid jets in particular in a common working space. This is carried out in particular also in the working space in which the deblocking is carried out. Thus, a simple and compact design as well as an economical and fast deblocking with high throughput are made possible.

According to a second, also independently achievable aspect of this invention, the apparatus preferably has two nozzle devices, which are designed or arranged for generating fluid jets that are inclined opposite to or differently from a radial plane of an axis of rotation of the lens and/or the block piece and/or which both can be moved in an oscillating manner—in particular along an axis of rotation of the lens or the block piece. This makes possible a simple design and in particular an economical and fast, i.e., efficient, deblocking with high throughput.

According to a third, also independently achievable aspect of this invention, the apparatus preferably has three nozzle devices for generating a first, a second, and an additional fluid jet in the working space, wherein the first fluid jet can be used and/or is provided to detach the lens together with the protective layer, if present, from the block material and/or block piece, the second fluid jet can be used and/or is provided to remove block material from the block piece, and the additional fluid jet can be used and/or is provided to remove the protective layer, if present, or block material from the deblocked lens. This makes possible a simple design and in particular an economical and fast deblocking with high throughput.

According to a fourth, also independently achievable aspect of this invention, both a holding device for the block piece and a holding device for the lens in each case have a rotary drive, so that in particular both for deblocking and after deblocking, the block piece and the lens can be rotated by a motor, thus ensuring that in particular, the removal of block material and of the optional protective layer is made possible in an especially efficient and fast as well as simple and reliable way.

According to a fifth, also independently achievable aspect of this invention, the apparatus preferably has a handling device with a movable carrier, wherein the carrier has multiple independently movable and/or actuatable grippers for the lens and the block piece. This allows for in particular a simple implementation and/or an optimized process sequence in the feeding of lenses that are to be deblocked.

Especially preferably, the carrier can be moved only in one direction and/or linearly or only in one plane. This allows for an especially simple and economical design.

Preferably, the grippers—preferably exclusively—can be moved, shifted, or telescoped transversely or perpendicular to the direction of movement and/or movement plane of the carrier.

According to a sixth, also independently achievable aspect of this invention, preferably the blocked lens, the deblocked lens, and the deblocked block piece are gripped by independently-operating and/or separate and/or independently-telescoping grippers, and/or the deblocked lens and the deblocked block piece are simultaneously gripped. This makes possible an optimized process sequence and in particular optimized feeding. When namely one deblocked lens and one deblocked block piece have been gripped, a blocked lens with a block piece can be conveyed directly again via an additional separate gripper; in particular, a working space and/or this holding device can thus be fed.

The grippers preferably work pneumatically and grip and/or hold the lens and/or the block piece especially preferably by underpresure and/or by means of corresponding suction devices. This allows for a simple and economical implementation and high flexibility even with lenses and/or block pieces of various sizes.

According to a seventh, also independently achievable aspect of this invention, after the deblocking, the lens is preferably turned by opening the working space and/or is swung away from the deblocked block piece. This allows for a simple and economical design as well as an optimized sequence of movement or process sequence.

According to an eighth, also independently achievable aspect of this invention, the lens is preferably turned by means of the holding device that holds the lens for deblocking and/or is pivoted by more than 90°, preferably essentially 180°, in order to make possible a simple sequence of movement or process sequence, in particular to avoid having an additional pivotable handling device. This is conducive to a simple and economical design.

According to a ninth, also independently achievable aspect of this invention, the deblocked lens is preferably turned and in particular placed with the block side upward in a transport carrier. This is conducive to transporting the lens forward in an especially preferred gentle way, since the flat side of the lens that faces away from the block piece is usually made concave and thus the lens ideally rests only in the area of its edge in the transport carrier.

According to a tenth, also independently achievable aspect of this invention, the apparatus preferably has a handling device that performs only linear movements in order to receive the blocked lens from a transport carrier and thus to feed the working space as well as to receive the lens that is turned after the deblocking and again to hand it off to a transport carrier. This makes possible an especially simple and economical design and an optimized sequence of movement.

In general, it is noted that the axis of rotation for rotating the lens during deblocking preferably runs at least essentially vertically and/or at least essentially parallel to the central axis of the block piece in conveying the blocked lenses to the apparatus and/or parallel to the optical axis of the deblocked lens in the removal from the apparatus. This is in turn conducive to a simple design. In particular, no (controlled) pivoting or tipping of the block piece is necessary, and/or a handling device that performs only linear movement can be used.

Preferably, the apparatus and/or handling device, at least its carrier, is designed CNC-controlled and/or for in particular position-controlled positioning of the lens or the block piece with the lens. This is conducive to an optimized or defined handling.

According to an eleventh, also independently achievable aspect of this invention, it is preferably provided that the deblocked lens—here preferably from the deblocking apparatus or its handling device—is placed in an additional transport carrier and is conveyed onward in the latter in particular for further processing independently of a transport carrier that originally was used for the blocked lens. This configures an optimized sequence and/or a better handling of the deblocked lens in the further processing, such as a cleaning, coating, an edge processing, etc.

According to another, also independently achievable aspect of this invention, the deblocked block pieces are preferably cleaned, tested—in particular for damage or fouling or an adhesion of block material—sorted—in particular according to shape and/or size, and/or intermediately stored. This is carried out especially preferably in the deblocking apparatus. Thus, a simple and optimized process sequence is made possible at low cost.

Especially preferably, the deblocking apparatus according to the proposed solution is designed in such a way that the deblocked block pieces can be conveyed onward or removed in a fully-automated or partially-automated manner.

Another, also independently achievable aspect of this invention lies in the fact that the block material is preferably preheated and/or the apparatus preferably has a heating device for heating or preheating the block material by means of radiation, and/or the block material is heated or preheated by means of radiation, especially preferably infrared radiation or microwave radiation. This makes possible a simple or economical implementation and/or a simple process sequence.

In particular, the heating or preheating of the block material is carried out in the area of a conveying step, in particular a conveyor belt, and/or before a removal of a lens that is to be deblocked from a transport carrier. This is conducive to an especially compact design and/or a minimization of the handling steps.

Several of the above-mentioned and subsequent aspects and features of this invention can be combined arbitrarily with one another, but also can be produced independently of one another.

Additional aspects, features, advantages, and properties of this invention follow from the following description of the preferred embodiments with reference to the accompanying drawings.

DETAILED DESCRIPTION OF THE INVENTION

In the figures, the same reference numbers are used for the same components and elements, even when a repeated description is omitted.

Figure 1:
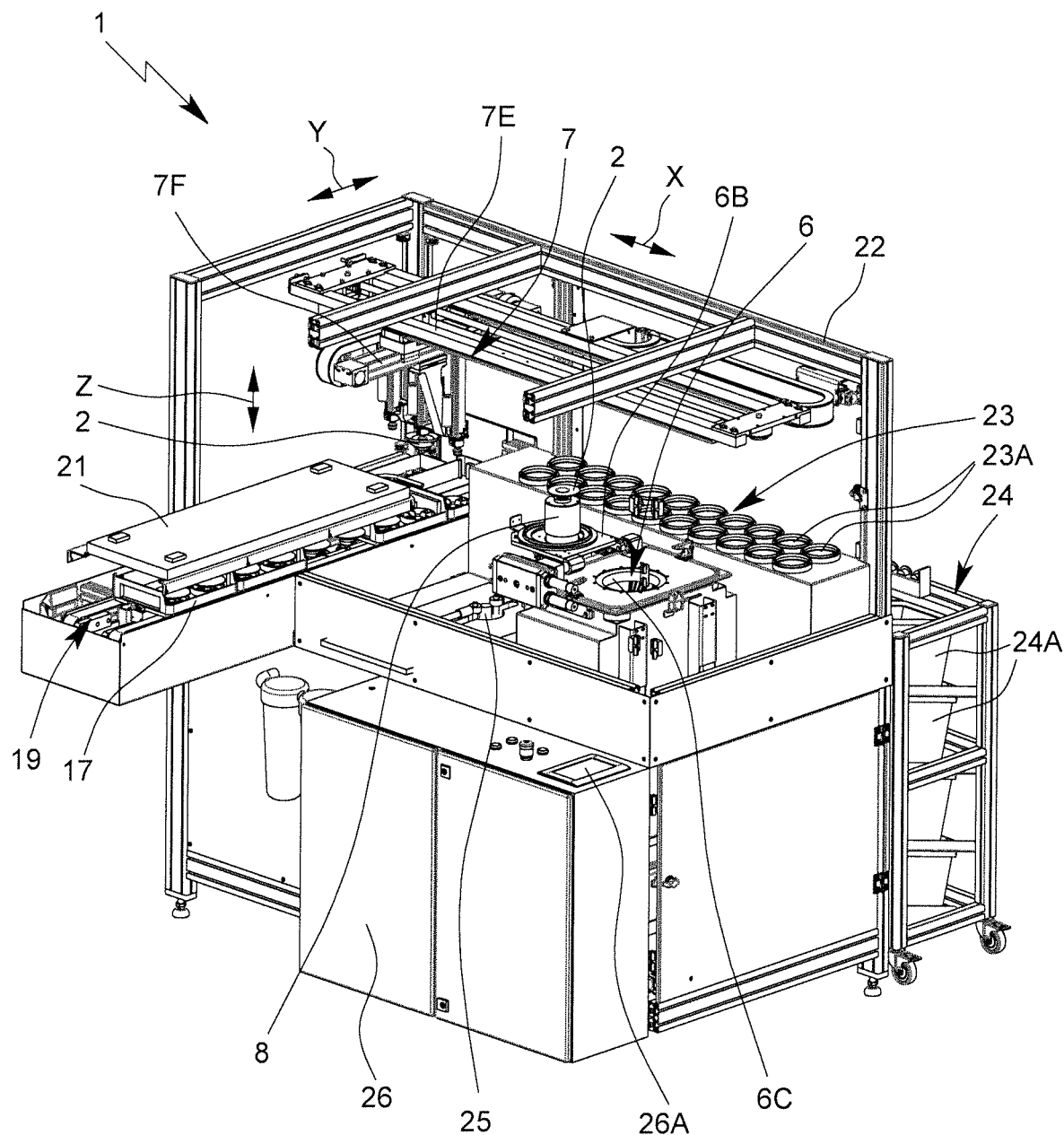
FIG. 1 is a diagrammatic perspective view of an apparatus according to the present invention for deblocking a lens.

In a diagrammatic view, FIG. 1 shows an apparatus 1 for deblocking—i.e., detaching—at least one lens 2 according to the invention. Preferably, the apparatus 1 is designed in such a way that multiple lenses 2 can be deblocked in succession.

Especially preferably, the lens 2 is a so-called eyeglass lens, i.e., a lens for a pair of eyeglasses.

The lens 2 preferably made of plastic, but optionally, it can also be made of glass or the like.

The lens 2 preferably has a diameter of several centimeters, in particular of more than 3 centimeters.

Figure 2:
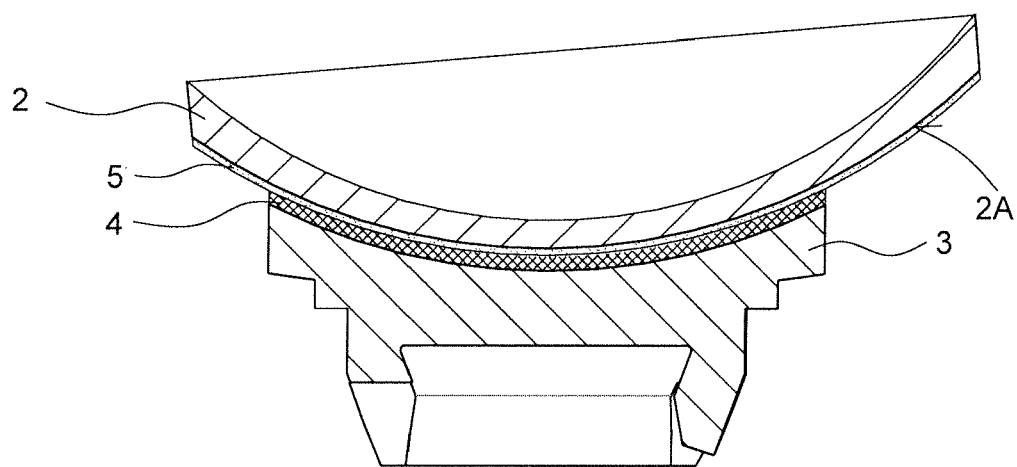
FIG. 2 is a diagrammatic sectional view of the blocked lens with a block piece.

In a diagrammatic section, FIG. 2 shows a lens 2, which is blocked, i.e., temporarily fastened, on an assigned block piece 3 by means of a block material 4.

The block piece 3 is designed in particular for a clamping with a defined rotational position for a processing of the assigned lens 2.

The block material 4 is especially preferably a thermoplastic, as described in particular in International Patent Publication WO 2011/018231 A1 and corresponding U.S. Pat. No. 9,340,669 B2. In principle, however, it can also be an alloy with a low melting point or another material, for example, an adhesive, an adhesive strip or the like.

Optionally, a protective layer and/or protective film 5 is arranged or provided on the block side 2A of the lens 2, i.e., the side of the lens that faces the block material 4 and/or block piece 3, as indicated diagrammatically in FIG. 2. The protective film 5 is preferably bonded to the lens 2 and/or block side 2A of the lens 2 and serves in particular to protect the already finished or formed smooth side or block side 2A of the lens 2.

In principle, however, it is also possible to block the lens 2 without the protective layer and/or protective film 5 directly by means of the block material 4.

Hereinafter, the term "protective film" 5 is always used even when there is another protective layer that optionally can be applied to the block side 2A of the lens 2. The subsequent embodiments and/or explanations then apply in particular accordingly.

Figure 3:
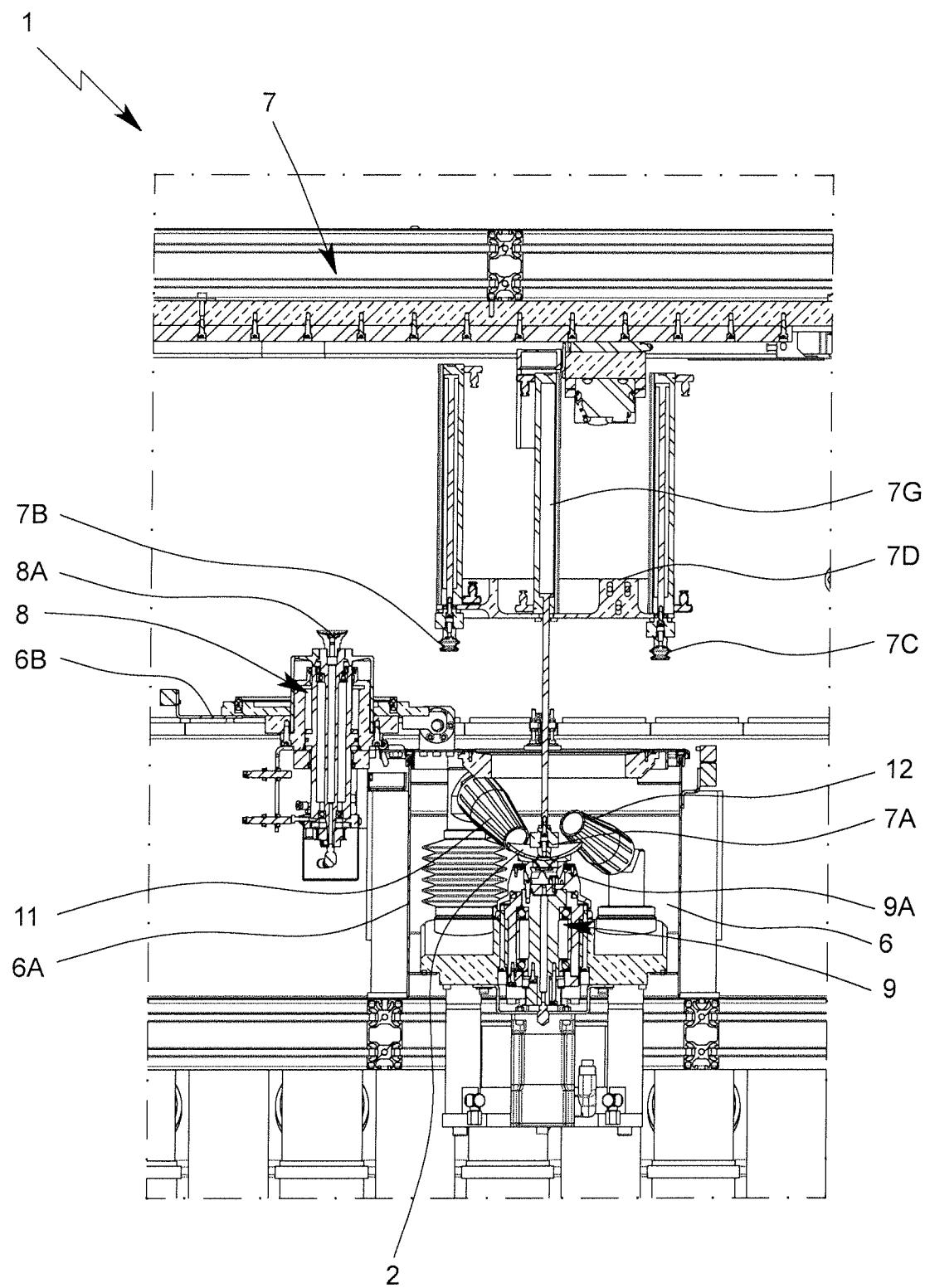
FIG. 3 is a diagrammatic illustration of a part of the apparatus.

The apparatus 1 according to the invention preferably has a working space 6, in which the deblocking is carried out. The perspective depiction in FIG. 1 and the diagrammatic section according to FIG. 3 show the apparatus 1 with an open working space 6.

The apparatus 1 preferably has a handling device 7 for gripping and/or handling the lens 2 and/or the block piece 3. It is diagrammatically indicated in FIG. 3 how the handling device 7 loads and/or feeds the working space 6 with a lens 2 that is to be deblocked.

Figure 4:
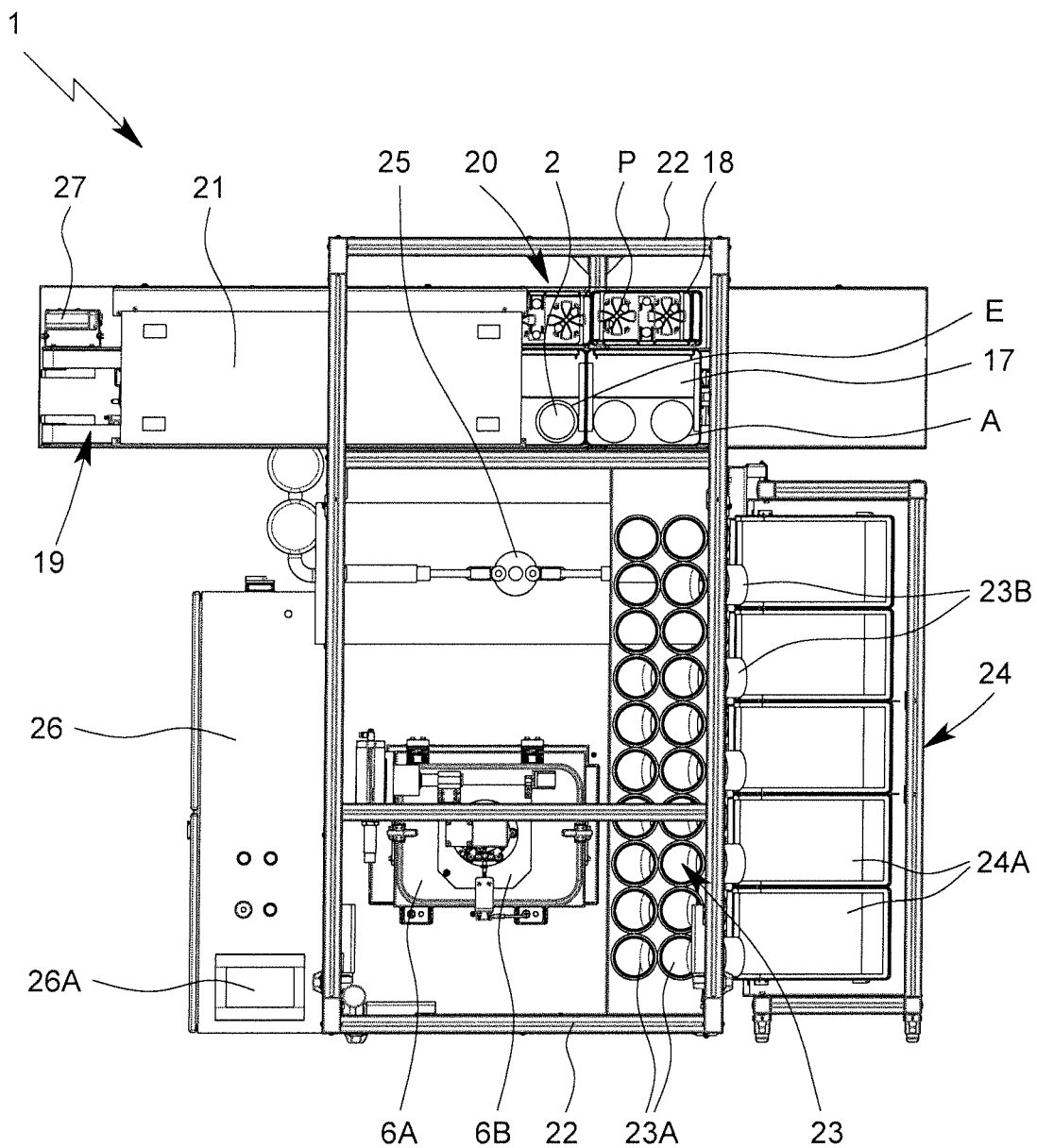
FIG. 4 is a diagrammatic top view of the apparatus.

In a diagrammatic top view, FIG. 4 shows the apparatus 1 without the handling device 7. Here, the working space 6 and/or its housing 6A is closed.

Figure 5:
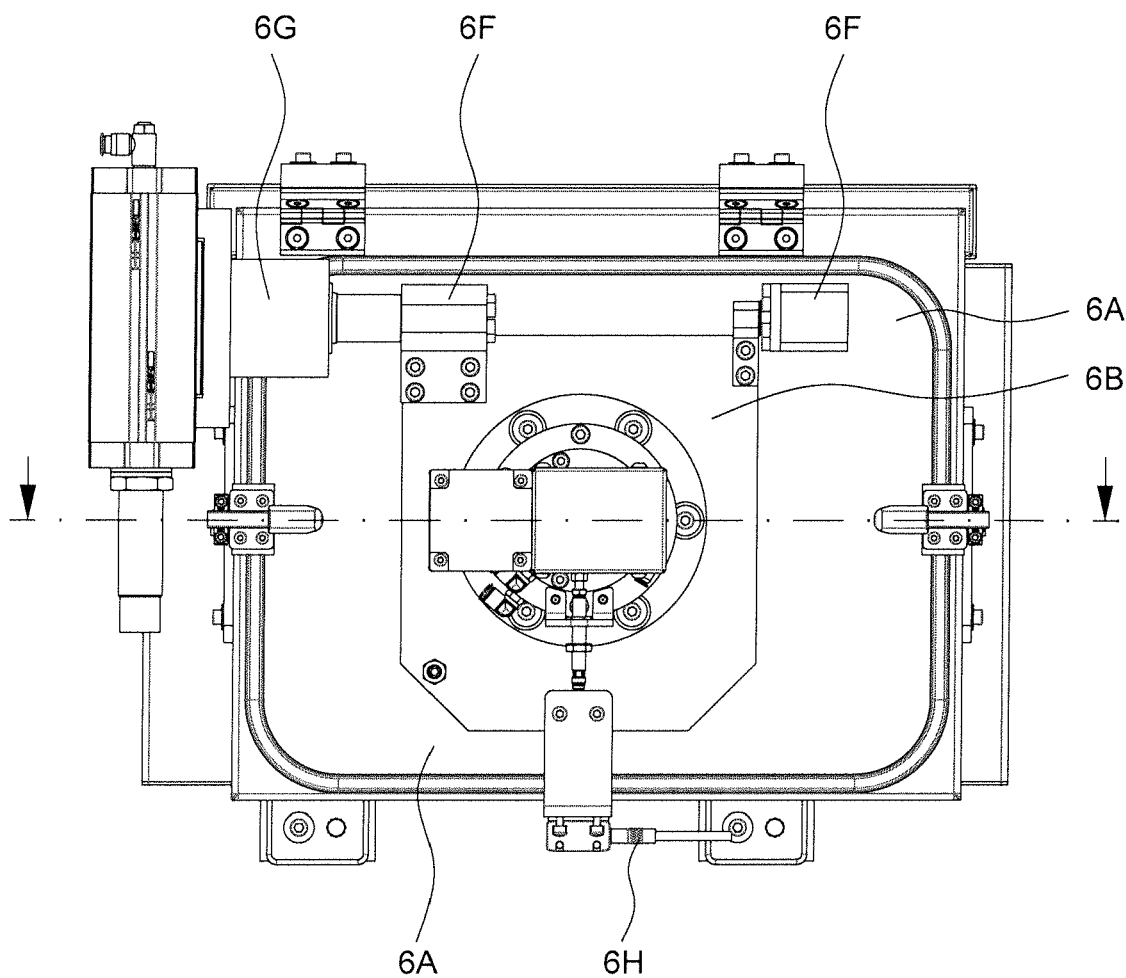
FIG. 5 is a diagrammatic top view of a working space of the apparatus.

In a sectional, enlarged top view, FIG. 5 shows the working space 6 and/or its housing 6A, which is closed (as depicted in FIG. 5) or can be closed in particular by a flap or door 6B. However, other design approaches are also possible here.

Figure 6:
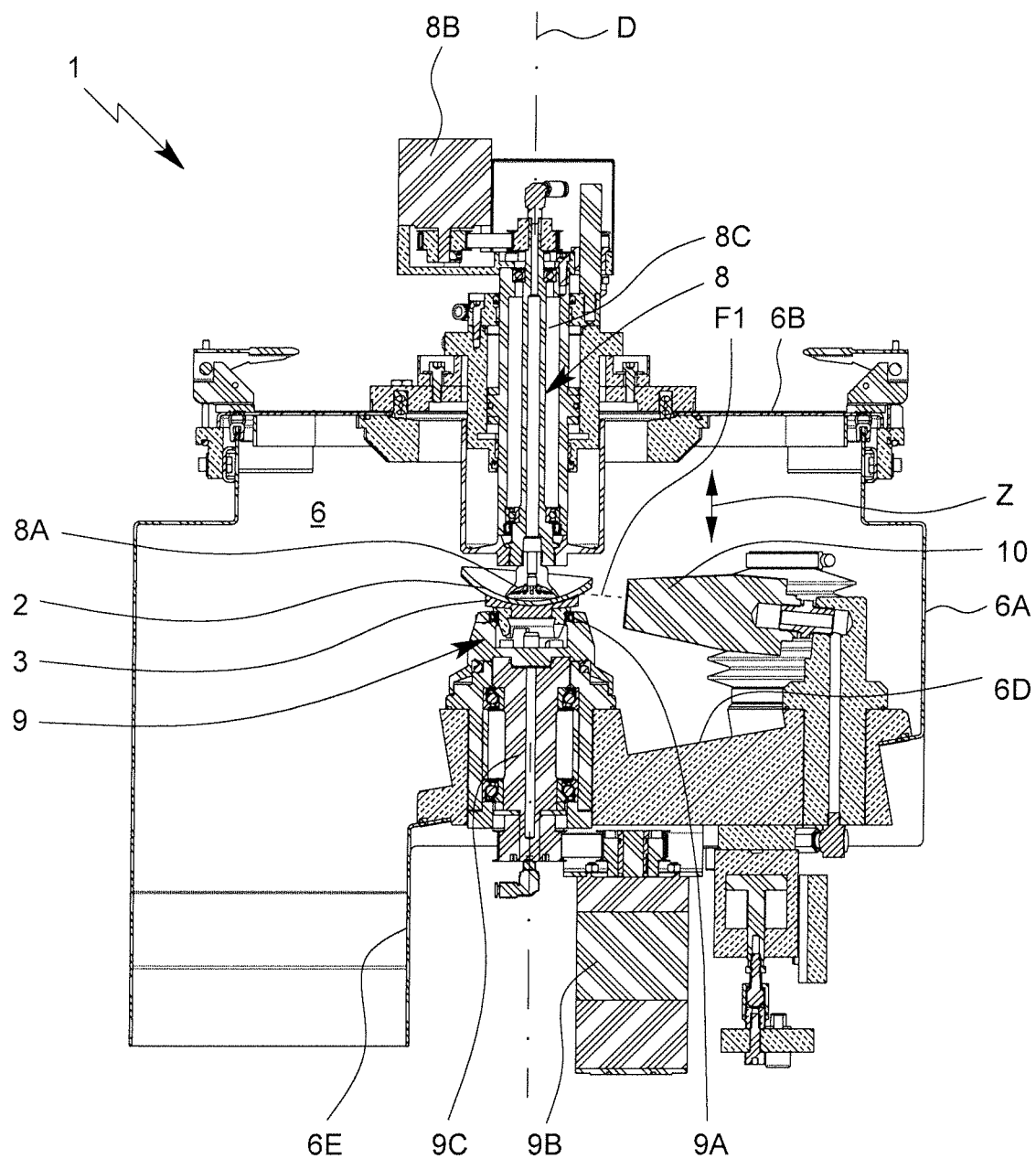
FIG. 6 is a diagrammatic sectional view of the working space during deblocking.

In a diagrammatic sectional view, FIG. 6 shows the apparatus 1 and/or its working space 6 during deblocking, i.e., here with closed opening 6C and/or closed door 6B.

The apparatus 1 preferably has a first holding device 8 for in particular rotating holding of the lens 2 during deblocking or in the working space 6.

In particular, the first holding device 8 has a gripper and/or holder 8A for in particular rotatable holding of the lens 2.

The holding device 8 and/or the holder 8A is preferably designed for pneumatic gripping or holding of the lens 2, in particular by underpressure. Preferably, the holder 8A is thus a suction device.

The first holding device 8 and/or its holder 8A is in particular designed in such a way that the lens can turn or rotate around the axis of rotation or central axis D that is indicated in FIG. 6. Especially preferably, the first holding device 8 has a corresponding motor or rotary drive 8B, which is coupled directly or indirectly with the holder 8A, for example via a belt drive, here in particular via a mounting 8C.

Especially preferably, the holding device 8 or more precisely its holder 8A can be moved and/or adjusted linearly and/or axially and/or along the axis of rotation D, especially preferably telescopically. This is carried out especially preferably pneumatically.

The apparatus 1 preferably has a second holding device 9 for in particular rotating holding of the block piece 3 during deblocking or in the working space 6.

In particular, the second holding device 9 has a holder 9A for in particular rotatable holding of the block piece 3.

The holding device 9 and/or the holder 9A is preferably designed for clamping and/or pneumatic holding of the block piece 3, in particular by underpressure. Preferably, the holder 9A is a chuck or a seat.

The first holding device 9 and/or its holder 9A is in particular designed in such a way that the block piece 3 can turn or rotate around the axis of rotation or central axis D that is indicated in FIG. 6. Especially preferably, the first holding device 9A has a corresponding motor or rotary drive 9B, which is coupled directly or indirectly with the holder 9A, for example via a belt drive, here in particular via a mounting 9C.

The deblocking, i.e., detaching, of the lens 2 from the block piece 3 and/or block material 4, is carried out preferably by means of a (first) fluid jet F1, which in particular laterally strikes the block material 4 and/or the boundary area with the block piece 3 and/or with the lens 2 and/or protective film 5, while the lens 2 and the block piece 3 rotate and/or are turned around the axis of rotation D. Thus, in particular, a fast detaching of the lens 2 together with the protective film 5 from the block material 4 is made possible in particular within a few seconds, especially preferably fewer than 15 seconds.

The axis of rotation D runs especially preferably transversely to the horizontal and/or at least essentially vertically or in the Z-direction.

The apparatus 1 preferably has a first nozzle device 10 for generating and/or releasing the fluid jet F1. The nozzle device 10 and/or its nozzle 10A and/or the fluid jet F1 can be moved and/or adjusted, as necessary, radially and/or parallel to the axis of rotation D and/or in a Z-direction, here in particular in the vertical direction and/or in its inclination relative to the axis of rotation D.

Especially preferably, the first nozzle device 10 is incorporated in a stationary manner so that a simple design is produced.

Preferably, a liquid jet, in particular a water jet, is used as the fluid jet F1. The fluid jet F1 is preferably under high pressure.

The fluid jet F1 and/or the liquid is preferably preheated or heated, depending on the block material 4 that is used. For example, when using a thermoplastic as block material 4, it is sufficient to preheat the fluid and/or the fluid jet F1 to a temperature that is lower than the melting point of the thermoplastic. For example, the melting point of the thermoplastic lies in the range of 60° C. to 70° C. The fluid and/or water W then has, for example, a temperature of between 30° C. and 50° C. and/or a temperature that lies at least 10° C. below the melting point of the thermoplastic. When using an alloy with a melting point of, for example, approximately 50 to 60° C., as is common currently, the fluid and/or water is preferably heated by more than 10° C. over the melting point and preferably has a temperature of approximately 65 to 90° C.

The deblocking, in particular a softening or melting and/or detaching of the block material 4, in particular a detaching of the protective film 5 and/or lens 2, is supported by the preheating and/or heating of the fluid and/or the liquid.

Alternatively, during deblocking, the lens 2 can also be detached directly from the protective film 5 instead of from the block material 4. In this case, the fluid jet F1 then strikes outside or on the periphery preferably in the area of the contour of the protective film 5 and/or in the transition of the protective film 5 with the lens 2 in order to carry out the deblocking process and/or detaching process.

During the deblocking, the lens 2 is relatively prestressed axially away from the assigned block piece 3 preferably by means of a tensile force, and/or after the deblocking, it is pulled upward and/or axially moved away, here in particular upward and/or by raising the lens 2.

Figure 7:
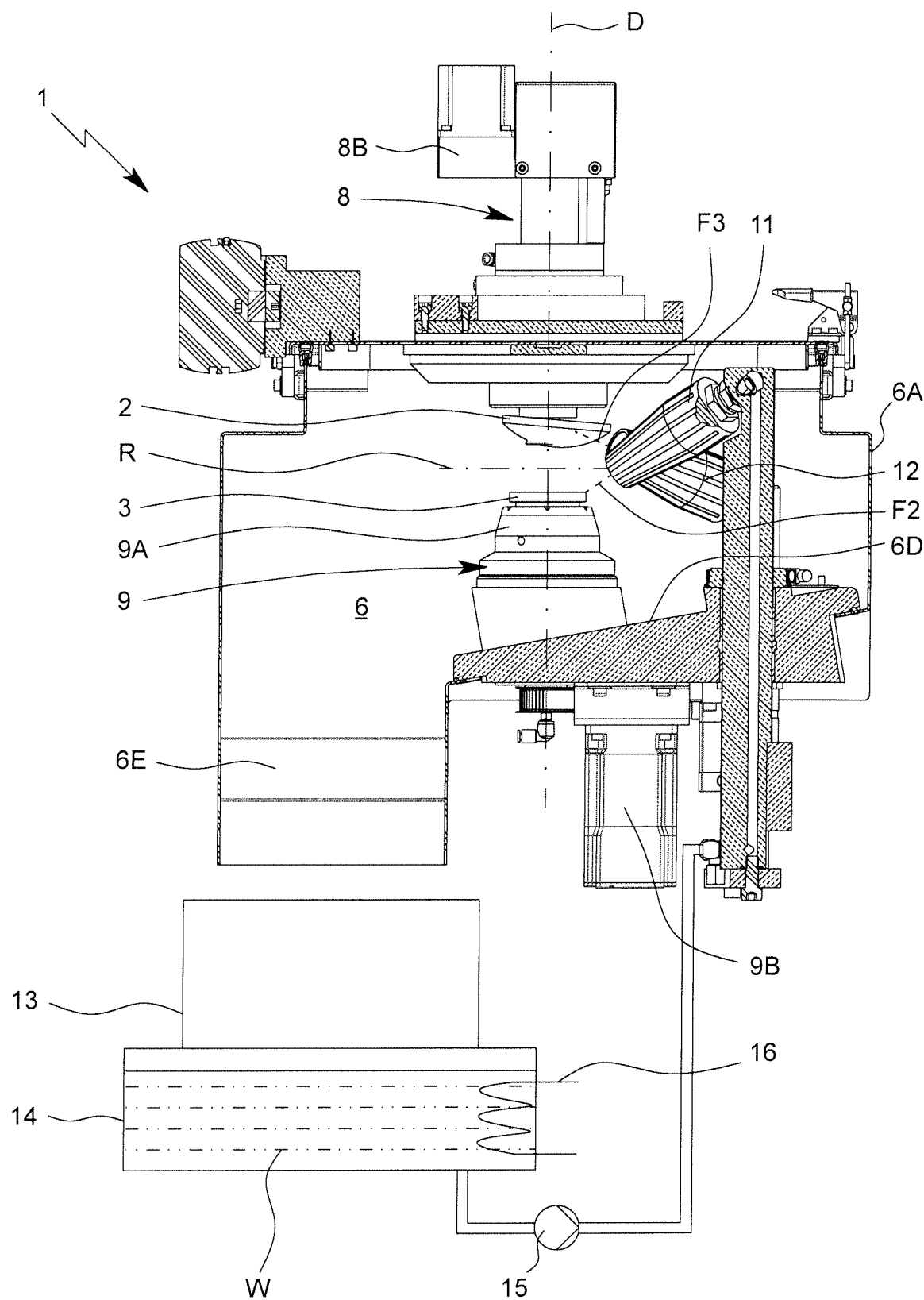
FIG. 7 is a diagrammatic sectional view of the working space with a deblocked lens.

In a diagrammatic section that is similar to FIG. 6, FIG. 7 shows the apparatus 1 and/or the working space 6 after a lens 2 is deblocked and/or is moved away from the assigned block piece 3.

Preferably, after the deblocking and/or after the moving away of the lens 2, the block piece 3 is cleaned and/or adhering block material 4 is removed. This is carried out especially preferably by means of a (second) fluid jet F2, as indicated diagrammatically in FIG. 7. However, another cleaning in the working space 6 and/or in the apparatus 1 or subsequently can also be carried out.

In the illustrative example, the apparatus 1 preferably has a second nozzle device 11 for cleaning the block piece 3 and/or for removing block material 4. In particular, the second nozzle device 11 serves to release and/or to generate the second fluid jet F2.

The second nozzle device 11 is preferably arranged in the working space 6 just like the first nozzle device 10.

In particular, the block piece 3 is held for cleaning or during cleaning by the second holding device 9 and/or its seat or holder 9A and in particular in this case is also rotated by a motor.

The fluid jet F2 for cleaning the block piece 3 and/or the second nozzle device 11 or nozzle thereof can be varied, adjusted and/or oscillated, i.e., moved back and forth, preferably during cleaning or for cleaning along the axis of rotation D or in the vertical or Z-direction and/or in its inclination relative to the axis of rotation D or its radial plane.

Preferably, a liquid, in particular water, is used as fluid for the fluid jet F2. In particular, the fluid is sprayed with high pressure on the block piece 3, in particular its side and/or flat side (block side) that faces the lens 2.

The fluid for the fluid jet F2 is preferably preheated or heated.

In particular, the identical and/or same or just preheated fluid as for the deblocking or as for the (first) fluid jet F1 is used.

Preferably, the optional protective film 5 is removed from the deblocked lens 2 in particular in the working space 6 and/or in the apparatus 1. This is carried out especially preferably by means of a (third) fluid jet F3 and/or in the position that is moved away from the block piece 3, depicted in FIG. 7.

In the illustrative example, the apparatus 1 preferably has a third and/or additional nozzle device 12 for removing block material 4 and/or the optional protective film 5 from the deblocked lens 2. This is preferably arranged just like the first and/or second nozzle device 10, 11 in the working space 6. In particular, the lens 2 is held by the first holding device 8 for removing block material residue and/or the protective film 5 and in this case is also rotated by a motor.

The third fluid jet F3 and/or the third or additional nozzle device 12 and/or nozzle thereof can preferably be rotated, adjusted, and/or oscillated during or for removal along the axis of rotation D and/or in the vertical or Z-direction and/or in its inclination relative to the axis of rotation D and/or its radial plane.

Preferably, a liquid, in particular water, is used as fluid for the fluid jet F3. In particular, the fluid is sprayed with high pressure on the lens 2, in particular its block side 2A.

The fluid for the fluid jet F3 is preferably preheated or heated.

In particular, the identical or same and/or just preheated fluid as for the deblocking and/or as for the first and/or second fluid jet F1, F2 is used.

The (second) nozzle device 11 and/or the (second) fluid jet F2 is preferably directed to the (deblocked) block piece 3 and/or assigned to the latter.

The (third) nozzle device 12 and/or the (third) fluid jet F3 is preferably directed to the (deblocked) lens 2 and/or assigned to the latter.

Especially preferably, the nozzle devices 11, 12 and/or fluid jets F2, F3 in each case are inclined relative to a radial plane R of the axis of rotation D and/or opposite to it, as indicated in FIG. 7.

Preferably, the nozzle devices 11 and/or 12 and/or fluid jets F2 and/or F3 can be moved back and forth, i.e., oscillated, in such a way that only the block side of the block piece 3 and/or the lens 2 in each case—in particular also taking into consideration the rotation of the block piece 3 and/or lens 2 that is preferably carried out in this case—is completely covered and/or cleaned. Especially preferably, a preferably exclusively linear movement of the nozzle device 11 and/or 12 in particular along and/or parallel to the axis of rotation D is carried out as an oscillating movement here.

The apparatus 1 and/or the working space 6 or its housing 6A preferably has an inclined bottom 6D and/or an outlet 6E, in order to make possible and/or to ensure flushing-out and/or transporting or flowing-out of detached block material 4, detached protective films 5, and liquids.

Preferably, a collecting tank 13, in particular for collecting solids, such as block material 4 and protective films 5, is arranged or can be positioned below the working space 6 and/or outlet 6E.

The collecting tank 13 preferably allows fluids or liquids, in particular the water that is used for deblocking or the like, to flow out preferably through a lattice bottom, in particular in a tank 14 that is arranged underneath, as indicated only diagrammatically in FIG. 7.

The water W and/or the other liquid is then used again and/or recirculated for additional deblocking of other lenses 2 and sent and/or fed in particular via a pump 15 and/or high-pressure pump to the nozzle devices 10, 11 and/or 12 via a line that is indicated in FIG. 7. However, other design approaches are also possible.

Especially preferably, the collecting tank 13 can be changed and/or emptied.

The tank 14 is preferably provided with a sensor or the like, not depicted, for monitoring the liquid level.

Also, the apparatus 1 preferably has a tempering device 16 for tempering the liquid. The tempering device 16 is indicated only diagrammatically in FIG. 7 and can be arranged, for example, in the tank 14 in order to heat or to hold the liquid in the tank 14 to a desired temperature.

Alternatively or in addition, the tempering device 16 can also be arranged, for example, in a fluid line, for example upstream or downstream from the pump 15, and can heat, for example as it passes, the liquid to the desired temperature.

After the deblocking and in particular cleaning (here by means of the fluid jets F2 and F3), the deblocked lens 2 and the deblocked block piece 3 are removed from the working space 6.

In particular, after the deblocking of the block piece 3, the lens 2 is swung away. This is done in particular after the axial moving away of the lens 2 relative to the block piece 3 and/or after the cleaning of the lens 2 and/or removal of the protective film 5 and/or after the cleaning of the block piece 3.

Especially preferably, the opening of the working space 6 and/or the door 6B is carried out only after the above-mentioned cleaning steps are concluded.

Especially preferably, the swinging-away of the deblocked lens 2 is carried out by opening the working space 6 and/or the door 6B and/or without gripping, in particular by swinging away the first holding device 8 together with the lens 2 contained thereon.

FIG. 3 shows the state with door 6B open and with a lens 2 that is swung away and/or pivoted out.

Especially preferably, the first holding device 8 is mounted to pivot, here together with the door 6B.

In the illustrative example, preferably a pivot bearing 6F and a pivot drive 6G are provided for the door 6B and/or first holding device 8, as indicated in particular in FIG. 5.

Especially preferably, the lens 2 is pivoted after the deblocking and/or out from the working space 6 in particular by more than 90°, preferably by approximately 180°. This pivoting movement preferably represents the only (necessary) pivoting or tipping movement of the lens 2 in the apparatus 1. The handling device 7 therefore especially preferably does not require any pivoting or tipping axis, so that a very simple and thus economical design is made possible.

After the deblocking and in particular after the cleaning and/or removal of the optional protective film 5, preferably by opening the working space 6, the lens 2 is thus swung away and/or turned from the deblocked block piece 3. In the case of a simple design, this makes possible an optimized process sequence.

The deblocked lens 2 is preferably handed off again to a (large) transport carrier 17, which has already served to convey still blocked lens 2, or to another (small) transport carrier 18, which has, for example, a different size or shape and in particular is smaller than the transport carrier 17, as diagrammatically indicated in FIG. 4, in order then to convey the deblocked lens 2 onward. In particular, another processing or a coating or the like is then carried out.

The deblocked lens 2 is preferably placed with its block side 2A upward in the transport carrier 17 or 18. This is very easily possible according to the proposed solution because of the turning or pivoting of the lens 2. Because of this type of storage, the [sic] in most cases rests only with its edge in the transport carrier 17 or 18, since the processing side of the lens 2 that is opposite to the block side 2A is in most cases made concave.

The transport carriers 17, 18 are preferably made boxy, i.e., have the shape of an open top box.

The transport carriers 17, 18 preferably offer space for at least two lenses 2, i.e., in particular for at least one pair of lenses 2, as is common in eyeglass lens manufacturing.

The conveying of the blocked lenses 2 and/or transport carriers 17 with blocked lenses 2 and/or the conveying onward of the deblocked lenses 2 and/or transport carriers 17 or 18 with deblocked lenses 2 is preferably carried out via a common conveying device or separate conveying devices, which in particular form a part of the apparatus 1 or can be assigned to the latter.

In the illustrative example, the apparatus 1 preferably has a conveying device 19 for conveying the blocked lenses 2 and/or transport carriers 17 with blocked lenses 2. This conveying device 19 can, as necessary, also use the conveying of the lenses 2 onward after the deblocking and/or the transport carriers 17 or 18 with the deblocked lenses 2.

In the illustrative example, the apparatus 1 optionally has an onward-conveying device 20 for conveying the deblocked lenses 2 onward, in particular the—preferably smaller—transport carriers 18 with the deblocked lenses 2, as indicated diagrammatically in FIG. 4.

Especially preferably, belt conveyors are used for the conveying and/or as conveying device 19 and/or 20.

Especially preferably, a heating or preheating of the block material 4 of the still blocked lenses 2 is carried out before the actual deblocking is carried out. The heating and/or preheating is preferably carried out even before the receiving of the blocked lenses 2 from the transport carriers 17 and/or in the area of the conveying and/or on the conveying device 19.

Especially preferably, the apparatus 1 has a heating device 21 for heating or preheating the block material 4.

The heating or preheating is carried out preferably to less than 40 or 50° C., depending on the block material 4 and/or thermoplastic that is used, and/or preferably by means of radiation, in particular by means of infrared radiation or microwave radiation.

The heating device 21 is preferably arranged in the area of the conveying device 19, in particular above, as depicted in FIG. 1, in order to irradiate the block material 4 of the blocked lenses 2 from above and/or to irradiate and/or heat even before the removal from the transport carriers 17.

After the heating and/or preheating, a removal of the blocked lens 2 is carried out in particular at a removal position E, which is indicated diagrammatically in FIG. 4, by means of the handling device 7.

The apparatus 1 and/or handling device 7 preferably has independently-operating and/or independently-telescoping grippers 7A, 7B, and 7C, in order to handle and/or grip—and in particular also to accommodate, convey and/or place—the blocked lens 2, i.e., the lens 2 together with the assigned block piece 3, the deblocked lens 2, and/or the deblocked block piece 3, in particular independently of one another or simultaneously, as diagrammatically indicated in FIGS. 1 and 3.

The apparatus 1 and/or handling device 7 preferably has a movable carrier 7D, which carries or holds the grippers 7A to 7C.

The carrier 7D is preferably movable or shiftable only in one direction—here, the X-direction—or only in one plane—here, the XY-plane.

The X-direction preferably runs horizontally and/or preferably transversely and/or perpendicular to the axis of rotation D and/or the Z-direction and/or the Y-direction and/or the conveying direction of the conveying device 19.

The Y-direction preferably runs horizontally and/or parallel to the conveying direction.

The X-direction and the Y-direction preferably span the XY-plane, in which the carrier 7D can be moved and/or positioned.

The apparatus 1 and/or handling device 7 preferably has a corresponding guide, here a linear guide 7E in the X-direction and/or a linear guide 7F in the Y-direction with corresponding drives, in order to make possible the desired adjustability and/or positioning in the X- and/or Y-direction of the carrier 7D and/or the grippers 7A to 7C.

Especially preferably, the handling device 7 is arranged above the working space 6 and/or the conveying device 19 and/or is fastened to a frame 22 of the apparatus 1.

Below, a preferred design of the grippers 7A to 7C is explained in more detail, wherein the latter are designed at least essentially similarly or optionally even identically, so that below, only the design of a gripper is explained in more detail.

The gripper is movable, adjustable and/or telescopable preferably only in one direction, here the Z-direction, and/or transversely and/or perpendicular to the direction of movement X or movement plane XY of the carrier 7D. Accordingly, the gripper has a controlling device 7G, which in particular operates pneumatically and which comprises in particular an adjusting cylinder and/or pneumatic cylinder.

The gripper preferably operates pneumatically, in particular with underpressure. Especially preferably, the gripper is designed as a suction device or has such a one. However, other design approaches are also possible.

In particular, the controlling device 7G has only two stops, between which the grippers can be moved forward and back, here in the Z-direction. A defined holding between these stops is not provided; rather, the gripper strikes the object that is to be gripped, i.e., the lens 2 or the block piece 3, during gripping by moving forward and/or dropping before the corresponding stop is reached.

After the gripping and/or suctioning of the lens 2 and/or the block piece 3, the controlling device 7 can be moved in the opposite direction and/or upward again back to the stop that limits the backward movement. This is done in particular by corresponding pneumatic pressurization. Thus, a very simple design is made possible.

Below, a more preferred process sequence is explained in more detail, wherein individual method steps in general can also be carried out independently of the other method steps or optionally also in another sequence.

The blocked lenses 2 are conveyed in particular in transport carriers 17, 18.

The blocked lenses 2 are used preferably with their block pieces 3 pointing downward and/or with a central axis in the transport carrier 17 that is vertical and/or parallel to the axis of rotation D. However, in principle, any other arbitrary conveying is also possible.

In the case of the conveying, preferably a preheating or heating of the block material 4 is carried out in particular by means of the heating device 21 and/or radiation, in particular infrared or microwave radiation. The preheating is carried out preferably from above and/or through the lens 2 and/or on the side of the lens. The preheating is done preferably during feeding and/or in the conveying device 19 and/or before reaching the removal position E.

A blocked lens 2 is picked up by the gripper 7A from the removal position E and/or the transport carrier 17. To this end, the carrier 7D and/or gripper 7A is positioned in a corresponding manner over the lens 2 and gripped by the gripper 7A and raised. FIG. 1 diagrammatically shows the already raised lens 2.

Then, the lens 2 is moved to the working space 6 in order to load and/or feed the latter with the blocked lens 2.

When another lens 2 is or has been already deblocked, a waiting period ensues until the deblocking has ended and until the working space 6 is or has been open and/or the first holding device 8 and/or deblocked lens 2 is or has been pivoted out.

After swinging away from the block piece 3 and/or in the case of a (completely) open door 6B and/or a pivoted-out holding device 8, the deblocked lens 2 points with its block side 2A preferably upward and/or with its central axis at least essentially parallel to the axis of rotation D or in the vertical direction.

Before the loading and/or feeding of the working space 6 with the next blocked lens 2, pick-up and/or removal of the deblocked lens 2 (here from the first holding device 8 and/or its holder 8A) and/or the deblocked block piece 3 (here from the working space 6 or from the second holding device 9 and/or its seat 9A) is carried out. This pick-up or gripping is carried out by the handling device 7, in particular by corresponding positioning of the carrier 7D or the grippers 7B and 7C.

Especially preferably, the deblocked lens 2 and the deblocked block piece 3 are picked up simultaneously and/or by the separate grippers 7B and 7C in order to make possible a fast process sequence.

Especially preferably, the grippers 7B and 7C are arranged on the carrier 7D so that without additional movement or shifting of the carrier 7D, the two grippers 7B and 7C detect and pick up, in particular can raise, the deblocked lens 2 and/or the deblocked block piece 3. In particular, a simultaneous gripping and/or pick-up of the deblocked lens 2 and the deblocked block piece 3 is thus made possible. This is conducive to a fast lens change and thus a fast process sequence.

In the illustrative example, the distance of the grippers 7B and 7C preferably corresponds to the distance—(horizontal here)—between the first holding device 8 and/or the holder 8A in the state that is folded out or pivoted out from the working space 6, on the one hand, and the axis of rotation D or the second holding device 9 and/or its seat 9A, on the other hand.

Then, the first gripper 7A with the blocked lens 2 can be positioned via the working space 6 and/or the second holding device 9, and the blocked lens 2 with its block piece 3 can switch to the second holding device 9 and/or seat 9A. This is carried out here by corresponding dropping of the gripper 7A.

The second holding device 9 and/or seat 9A is preferably provided with a flexible and/or ring-like rubber element or holding element and/or is designed for clamping and/or pneumatic holding of the block piece 3.

Preferably, the holding and/9 and/or seat 9A has a chuck in order to be able to hold or pick up the block piece 3 and thus also the blocked lens 2 in its rotational position. This is essential in particular during pick-up, since the blocked lenses 2 are usually conveyed with a defined rotational position and are delivered by the handling device 7 with a defined rotational position to the holding device 9. The chuck then makes possible a clamping or holding of the block piece 3 that is defined relative to the rotational position.

In particular, the seat 9A and/or the chuck is always held in the same rotational position after the rotation in order to make possible a problem-free change in the block piece 3, in particular a pick-up of a new block piece 3 with a defined rotational position.

It is to be noted that the handling device 7 preferably performs exclusively linear movements—i.e., no pivoting or tipping movements—in order to load the working space 6 and/or the second holding device 9 with the blocked lens 2 and the assigned block piece 3 for deblocking. Corresponding movements are also sufficient for the later pick-up of the deblocked lens 2 and for placing it in a transport carrier 17 or 18. Accordingly, the handling device 7 can be designed very simply and economically.

After the gripper 7A comes out, the working space 6 is closed. This is carried out in particular by closing the opening 6C and/or door 6B. In the illustrative example, this is carried out by means of the pivot drive 6G.

The pivot drive 6G operates preferably pneumatically, hydraulically, or electrically.

The swivel axis of the pivot bearing 6F runs preferably horizontally and/or parallel to the Y-direction.

The apparatus 1 preferably has a device 6H for locking the door 6B in the closed state and/or for detecting the closed state of the door 6B, as diagrammatically indicated in FIG. 5.

After the first holding device 8 pivots back in the working space 6 and/or the working space 6 closes, the holder 8A is preferably placed on the lens 2 that is to be deblocked, here by axial dropping, in particular pneumatically, and grips and/the latter (here by suctioning). To this end, for example, the mounting 8C can be moved axially relative to the axis of rotation D or forms a part of an adjustment drive or pneumatic cylinder.

For deblocking, the lens 2 and the block piece 3 are put in rotation in the working space 6, and a lifting force or tensile force is exerted (here by means of the first holding device 8 and/or of the holder 8A and/or of the second holding device 9 and/or of the holder 9A) in order to prestress the lens 2 and the block piece 3 axially away from one another. In particular, to this end, a pneumatic pressurization is carried out, especially preferably to generate a relatively low moving force or lifting force in order to prestress the gripped and/or suctioned lens (somewhat) away from the block piece 3 in the axial direction.

The lens 2 and the block piece 3 are put in rotation by a motor by the corresponding rotary drives 8B and 9B.

The first fluid jet F1, which in particular as a hot liquid jet and in particular with high pressure strikes the block material 4 and/or its transition area to the block piece 3 and/or the lens 2 and/or protective film 5, leads to a (further) softening and/or to an especially fast detachment of the lens 2 and/or protective film 5 from the block piece 3 and/or block material 4.

After detaching and/or deblocking, the lens 2 and the block piece 3 are moved away from one another axially and/or are moved apart. In particular, the lens 2 is raised or is moved away, especially preferably because of the in particular pneumatic prestressing.

Especially preferably, the holder 8A is pulled back or raised far enough for a defined or uniform stop to be reached. In this way, the lens 2, in particular also in the case of different lens thicknesses, is moved so far away from the block piece 3 that an axial distance that is sufficient for the subsequent cleaning or removal of block material 4 and/or protective film 5, especially preferably of more than 5 mm, in particular of more than 10 mm, and in particular of approximately 2 cm or more, is reached.

Then, the optional preferred cleaning of the block piece 3 and/or removal of the block material 4 from the block piece 3 is carried out by means of the second fluid jet F2 and/or the preferred removal of the protective film 5 and/or of block material residue from the lens 2 is carried out by means of the third fluid jet F3. The two are carried out preferably simultaneously and/or in the same working space 6 as the deblocking, so that a very simple and fast process sequence is made possible.

It is to be noted that for the cleaning of the block piece 3, optionally also the first nozzle device 10 or the first fluid jet F1 can be used, in particular when the first nozzle device 10 and/or the first fluid jet F1 can be adjusted in a suitable way.

It is also to be noted that instead of the third fluid jet F3 and/or the additional nozzle device 12, in principle also the first or second nozzle device 10, 11 and/or the first or second fluid jet F1, F2 can be used for the removal of the protective film 5 and/or of block piece residues from the lens 2, in particular when a corresponding adjustability of the nozzle device 10 or 11 or the fluid jet F1 or F2 is provided.

As already mentioned, the apparatus 1 preferably has a pump 15 for corresponding supplying of the nozzle devices 10 to 12 with the fluid, here in particular water W or another liquid.

Especially preferably, the fluid and/or water W is filtered, in particular in multiple stages and/or by means of a fine filter, not depicted, especially preferably so that particles over 1 μm or 2 μm are filtered out in order to keep the lens 2 from being damaged by the fluid jets F1, F2, F3.

The supplying is done in particular at the desired pressure, and/or it is adjusted to the pressure via corresponding control valves or regulating valves.

Also, a desired tempering or preheating of the liquid and/or the water W is preferably carried out in order to facilitate and/or to accelerate or just to make possible the deblocking and subsequent cleaning and/or removal.

After the working space 6 is loaded and/or fed with the (new) blocked lens 2, the handling device 7 normally also holds the previously picked-up deblocked lens 2 and the picked-up block piece 3.

The deblocked and preferably cleaned block piece 3 can, as necessary, be output or handed off again via the transport carrier 17 or in some other way.

Especially preferably, the cleaned block pieces 3 are sorted. In particular, the device 1 has a sorting device 23 for this purpose, which system is indicated in FIG. 4.

In the illustrative example, the sorting apparatus 23 preferably has various receiving openings 23A, to which the block pieces 3 are handed off depending on shape and/or size. Preferably, the block pieces 3 are output in a sorted manner via slides or pipes 23B, here especially preferably to an assigned trolley 24 and/or to an assigned receptacle 24A, as indicated in FIG. 4.

The deblocked lens 2 is optionally checked in particular optically, preferably to see whether it has been cleaned correctly and/or has undesirable adhesions of block material 4, the protective film 5 or the like, or other fouling.

The apparatus 1 preferably has a testing device 25 in order to be able to undertake the above-mentioned testing or another testing of the deblocked lens 2.

The testing device 25 is preferably arranged between the working space 6 and the conveying device 19.

The testing device 25 is preferably arranged in such a way that the handling device 7 and/or the gripper 7B that holds the deblocked lens 2 can position and/or hold the deblocked lens 2 directly on or above the testing device 25 to perform the testing.

After the optional testing, the deblocked lens 2 is output or handed off again, in particular to the conveying device and/or onward-conveying device 20 or a transport carrier 17 or 18.

When the deblocked lens 2 is placed again in a transport carrier 17, this can be in particular by placing it in the empty removal position E, as indicated in FIG. 4. Especially preferably, the placing of the deblocked lens 2 is carried out again in the same position in the same transport carrier 17, from which the lens 2 was originally removed. In particular, the transport carrier 17 is provided namely with information or an information medium, so that it is possible to identify or determine which lens or which order this is, so that all information necessary for the processing in particular can be accessed or read directly.

Alternatively or optionally, a hand-off or a placement of the deblocked lens 2 can also be carried out on the other transport carrier 18, for example at a position P, as indicated in FIG. 4.

Especially preferably, the positions E and P are behind one another in one of the directions of movement of the carrier 7D and/or the handling device 7 and/or in the X direction.

Especially preferably, the two conveying devices 19 and 20 are arranged beside one another and/or have parallel conveying directions.

The apparatus 1 preferably has a control device 26, in particular with an operating panel or touchscreen 26A for controlling the preferred process sequence and/or the apparatus 1.

The apparatus 1 preferably has an acquisition device 27—here a barcode reader—in order to be able to pick up information on the individual orders and/or lenses 2 to be deblocked or block pieces 3 that are used. This information can be forwarded, for example, directly and/or indirectly via the transport carrier 17—here preferably via a barcode in particular to a consignment note—the lens 2 to be deblocked and/or the block piece 3 thereof and/or can be made available or accessed by a central control or job management. In particular, without additional checking or measuring of the block pieces 3, this makes it possible to sort the latter according to size and/or shape, since with this information or information derived therefrom, it can be determined what type of block piece 3 was used in each case.

Alternatively or in addition, the apparatus 1 can also have a device for checking the block pieces 3 in order to determine whether the block pieces 3 have been cleaned in a desirable way, whether there is damage, and/or what shape and/or size the block pieces 3 have.

The apparatus 1 can optionally also have a device, not depicted here, for cleaning and/or drying the transport carrier(s) 17 and/or 18.

In addition, the apparatus 1 can also be designed to prepare or to generate the information and/or information media, such as in the case of the transport carriers 17, also for the additional transport carrier 18, in order to prepare information in a corresponding manner on the lenses 2 that are placed in each case. This information and/or information media, such as a barcode, for example on a data sheet, can be generated, printed, (electrically) described by the apparatus 1, as necessary, and/or transferred from the previous transport carrier 17 of the lens 2, for example by corresponding switching of the information medium from one lens carrier 17 to the additional lens carrier 18.

Individual aspects and features of the apparatus 1 according to the proposed solution and the method according to the proposed solution for deblocking lenses 2 can also be produced independently of one another but also in any combination.

What is claimed is:

1. Apparatus for deblocking a lens from a block piece, on which the lens is blocked by means of a block material, wherein a block facing side of the lens, comprising:
   a working space,
   a first holding device for holding of the lens in the working space and for rotating the lens about an axis of rotation,
   a second holding device for holding of the block piece in the working space, and
   multiple nozzle devices for dispensing fluid jets in the working space,
   further comprising:
   first, second and third nozzle devices for respectively generating first, second, and third fluid jets in the working space, wherein the first fluid jet is operable for detaching the lens from the block material, the second fluid jet is operable for removing block material from the block piece, and the third fluid jet is operable for removing at least one of a protective layer or block material from the lens, at least one of the three nozzle devices being arranged at a different angle than the other two nozzles relative to a central axis of the holding devices,
   wherein at least one of the holding devices has a rotary motor drive, and
   wherein at least one of the first nozzle device, the second nozzle device or the third nozzle device is linearly movable back and forth in a direction parallel to the axis of rotation of the lens.

2. Apparatus according to claim 1, wherein the second nozzle device is movable back and forth along an axis of rotation of the lens.

3. Apparatus according to claim 1, wherein the first and second holding devices are axially movable away from one another.

4. Apparatus according to claim 1, wherein the first holding device has a holder for rotatable holding of the lens, wherein the holder is displaceable relative to the block piece in a linear manner.

5. Apparatus according to claim 1, wherein the first nozzle device is adapted for dispensing the fluid jet laterally to the block material, while the lens rotates together with the block piece.

6. Apparatus according to claim 1, further comprising an onward-conveying device for conveying of other transport carriers for receiving deblocked lenses.

7. Apparatus according to claim 1, further comprising a testing device for optical testing of at least one of a blocked or deblocked lens.

8. Apparatus according to claim 1, further comprising a sorting device for deblocked block pieces.

9. Apparatus according to claim 1, further comprising means for simultaneous removal of block material remaining on a deblocked block piece by means of the first fluid jet and at least one of the protective layer or block material from the deblocked lens by means of the second fluid jet.

10. Apparatus according to claim 1, further two of said nozzle devices are arranged for generating fluid jets that are at least one of inclined opposite to or differently from a radial plane of an axis of rotation of the blocked lens in the working space or which both can be moved in an oscillating manner along an axis of rotation of the blocked lens.

11. Apparatus according to claim 1, wherein each of the holding devices has a rotary motor drive.

12. Apparatus according to claim 1, wherein at least the first holding device for holding of the lens has a rotary motor drive.

13. Apparatus for deblocking a lens from a block piece, on which the lens is blocked by means of a block material, comprising:
   a working space,
   a first holding device for holding of the lens in the working space,
   a second holding device for holding of the block piece in the working space, and
   multiple nozzle devices for dispensing fluid jets in the working space,
   further comprising:
   first, second and third nozzle devices for respectively generating first, second, and third fluid jets in the working space, wherein the first fluid jet is operable for detaching the lens from the block material, the second fluid jet is operable for removing block material from the block piece, and the third fluid jet is operable for removing at least one of a protective layer or block material from the lens,
   wherein each of the holding devices has a rotary motor drive, and
   wherein at least one of the first nozzle device, the second nozzle device or the third nozzle device is linearly movable back and forth in a direction parallel to an axis of rotation of the lens.

* * * * *